Oct. 27, 1953 — C. ROSSO — 2,657,357
MULTIPLE SCALE ELECTRICAL TEST INSTRUMENT
Filed Aug. 7, 1950 — 2 Sheets-Sheet 1
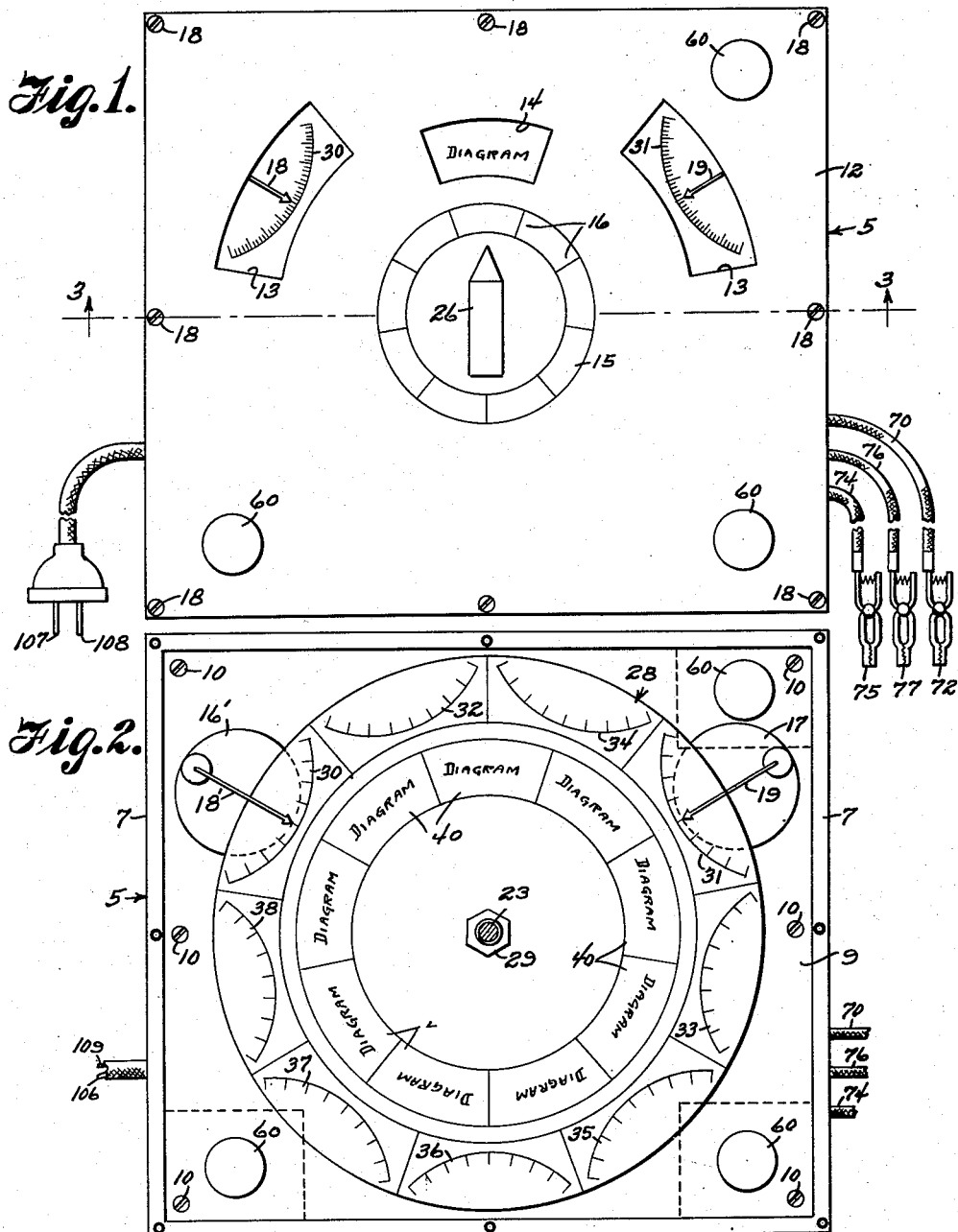
INVENTOR.
Charles Rosso
by Victor J. Evans & Co.
ATTORNEYS Oct. 27, 1953

C. ROSSO 2,657,357

MULTIPLE SCALE ELECTRICAL TEST INSTRUMENT

Filed Aug. 7, 1950

INVENTOR.
Charles Rosso
BY Victor J. Evans & Co.
ATTORNEYS

Patented Oct. 27, 1953

2,657,357

UNITED STATES PATENT OFFICE 2,657,357

MULTIPLE SCALE ELECTRICAL TEST INSTRUMENT

Charles Rosso, Cimarron, N. Mex.

Application August 7, 1950, Serial No. 178,022

5 Claims. (Cl. 324—114)

The present invention relates to electrical testing apparatus, and more particularly to a unit for simultaneously indicating the values of the electric current and potential of an electric circuit, electrical devices and various pieces of electrical equipment.

One object is to provide an electrical testing unit employing two meter movements arranged at an acute angle on the panel of the instrument, and to provide a plurality of scales on a movable dial which may be selectively positioned to cooperate with a pointer arm of each meter movement.

Another object is to provide an electrical testing unit having two meter movements which are arranged in a circuit having resistance and capacitance which are selectively connected in circuit with the meters by means of a control switch.

Another object is to provide an electrical testing unit in which the dial carrying the various scales for the meter movements are connected to the selective control switch such that in various positions of the control switch certain resistance elements will be placed in series and parallel with the coils of the meter movements to enable the testing unit to be used for testing various pieces of electrical equipment.

Another object is to provide an electrical testing unit in which rotation of the selector switch to couple various resistances in the circuit with the coils of the meters will rotate the dial upon which the scales are marked or printed to a position corresponding to the particular instrument diagram or circuit arrangement desired.

Another object is to provide an electrical testing unit for simultaneously indicating the condition of various pieces of electrical equipment and producing a simultaneous reading of the electrical quantity, current and potential of the electric circuit being tested and to enable rapid changes to be made in the testing circuit depending upon the piece of equipment being tested.

Another object is to provide an electrical testing instrument having a rotatable dial with the test circuit for various pieces of equipment marked thereon such that the technician can rotate the selector switch and dial in unison to present the selected circuit diagram on the dial in back of an opening in the panel. The same dial is also provided with separate scales for the meters which are positioned to cooperate with the needles of the meters to correspond to the preselected electrical testing circuit.

Another object is to provide an electrical testing apparatus for testing various pieces of electrical equipment which is embodied in a single unit such that all external connections of shunts and multipliers are eliminated.

Another object is to provide an electrical testing unit having a rotatable disk upon which is printed correctly calibrated scales which are selectively positioned adjacent the meters so that when the selector switch is rotated to produce a change in the resistance in parallel or series with the meters the proper scale will be presented to the corresponding meter.

Other objects and advantages of the invention will become apparent during the course of the following description of the accompanying drawings wherein:

Figure 1 is a front elevational view of the electrical testing unit showing the manner in which the meters are positioned so that the pointers extend over the peripheral edge of a selectively operable dial to cooperate with proper scale markings thereon.

Figure 2 is a front elevational view of the testing unit showing the control panel removed to illustrate the manner in which the rotatable dial is marked to provide a series of scale markings around the peripheral edge which are adapted to cooperate with the needles or pointers of the meter movements and also to show the spaces which are adapted to be marked to show the wiring diagram of the test circuit including both meters.

Figure 3:
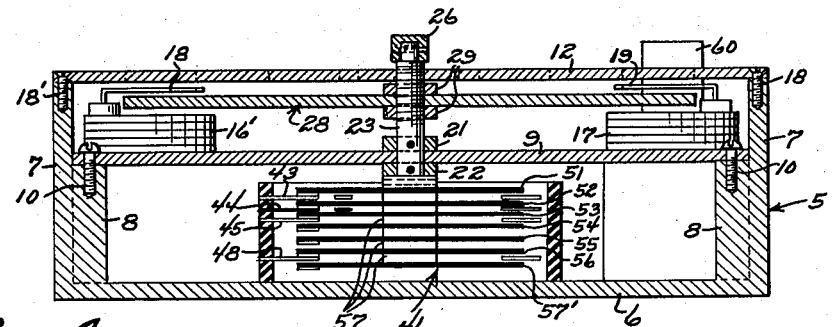
Figure 3 is a vertical cross-sectional view taken on line 3—3 of Figure 1 and looking in the direction of the arrows to illustrate the selector switch and the rotatable dial affixed to the actuator thereof to rotate therewith. The electric meters being arranged obliquely so that the pointers thereof will cooperate with pre-selected scale markings.

In the drawings, and more in detail, there is shown in Figures 1 to 3 inclusive for the purpose of convenience of illustration a testing apparatus including a casing generally designated 5 of box-like form having a bottom wall 6 and side walls 7. The side walls 7 are provided with portions 8 of increased thickness to form a support for a sub-panel structure 9 (Figure 3) which is held in place by screws or the like as at 10. The sub-panel 9 is thus mounted below the upper edges of the side walls 7 and is adapted to support the selector switch which will be presently described.

Mounted on the upper edges of the side walls 7 is a control panel 12 having a pair of oblique openings 13 and a central opening or window 14 of somewhat arcuate shape. In addition, the panel 12 is marked to provide an indicator dial 15 having scale markings 16. The panel is secured to the upper edges of the walls 7 by means of screws 18.

Mounted on the sub-panel 9 beneath the openings 13 is a pair of electrical meters 16 and 17 of the galvanometer type which may be alternately used as an ammeter or a voltmeter, depending upon the electrical circuit in which the galvanometer is connected. The pointers or needle indicators 18 and 19 of the respective meters 16 and 17 are arranged to project beneath the windows or openings 13 and preferably, the meters 16 and 17 are of the moving coil type, but it is to be understood, that other forms of electrical measuring instruments may be used having similar characteristics.

Supported on the sub-panel 9 and journaled between fixed collars 21 and 22 is a rotatable shaft 23 having its upper end threaded as at 24. The extreme upper end is reduced as at 25 and has keyed thereto an indicator knob 26 forming a finger grip to facilitate rotation of the shaft 23. Secured to the shaft 23 is a disk 28 which is clampingly held thereon by means of opposed clamping nuts 29, and said indicating disk 28 is of a diameter great enough to project beneath the oblique windows 13 as well as the window 14. Printed or otherwise marked on the peripheral edge of the disk 28 is a series of scale markings 30 and 31, 32 and 33, 34 and 35, which form sets adapted to appear in unison in the respective window openings 13. Additional scale markings 36, 37, and 38 may be used in conjunction with the scale markings 31, 33 and 35 after the dial 28 has rotated a predetermined distance by means of the knob 26. Also marked on the dial 28 is a series of wiring diagrams in the areas indicated by the legend "Diagram" and shown as at 40.

The lower end of the shaft 23 projects beneath the sub-panel 9 and forms a control for a rotatable selector switch generally designated 41. The selector switch includes a contact supporting cylinder 42 concentric with the shaft 23 and secured to the inner periphery of the cylinder 42 is a series of stationary contacts 43, 44, 45, 46, 47 and 48. An additional series of contacts 49 are arranged in the inner periphery of the support 41 for accommodating electrical connections with a rectifier network circuit which will be later described. The switch contacts 43 to 49 are fixed and are embedded in the cylindrical support 42 in circumferentially spaced apart relation, and since the support 42 is formed of insulating material the contacts are thus electrically insulated one from the other. Cooperating with the fixed contacts 43 to 49 inclusive is a series of movable contacts which are carried by insulating disks 51, 52, 53, 54, 55 and 56. The contacts on the insulating disks 51 to 56 inclusive are insulated one from the other, and are mounted on the underside of the disks adjacent the peripheral edge and said disks are spaced from one another by a plurality of spacers 57 mounted on the lower end of the shaft 23. Means is provided for locking the disks 51 to 56 on the shaft 23 (not shown). Suitable electrical connections for the contacts on the disks 51 to 56 are provided and are shown in the diagram in Figure 4, which will be presently described. Since the disks include a single contact, one for each disk the reference numerals 51 to 56 will indicate such contacts as well as the switch arms in the diagram in Figure 4.

The panel 12 may be provided with switch buttons 60 operable from the face thereof for certain circuits, and it will be observed that rotation of the knob 26 will rotate the disk 28 so that when the selected diagram appears in the opening 14 corresponding scale readings 30—31 for the electrical meters 16 and 17 will appear in the openings 13, and by selecting a particular measuring diagram corresponding meter reading scales will appear beneath the openings 13.

Figure 4:
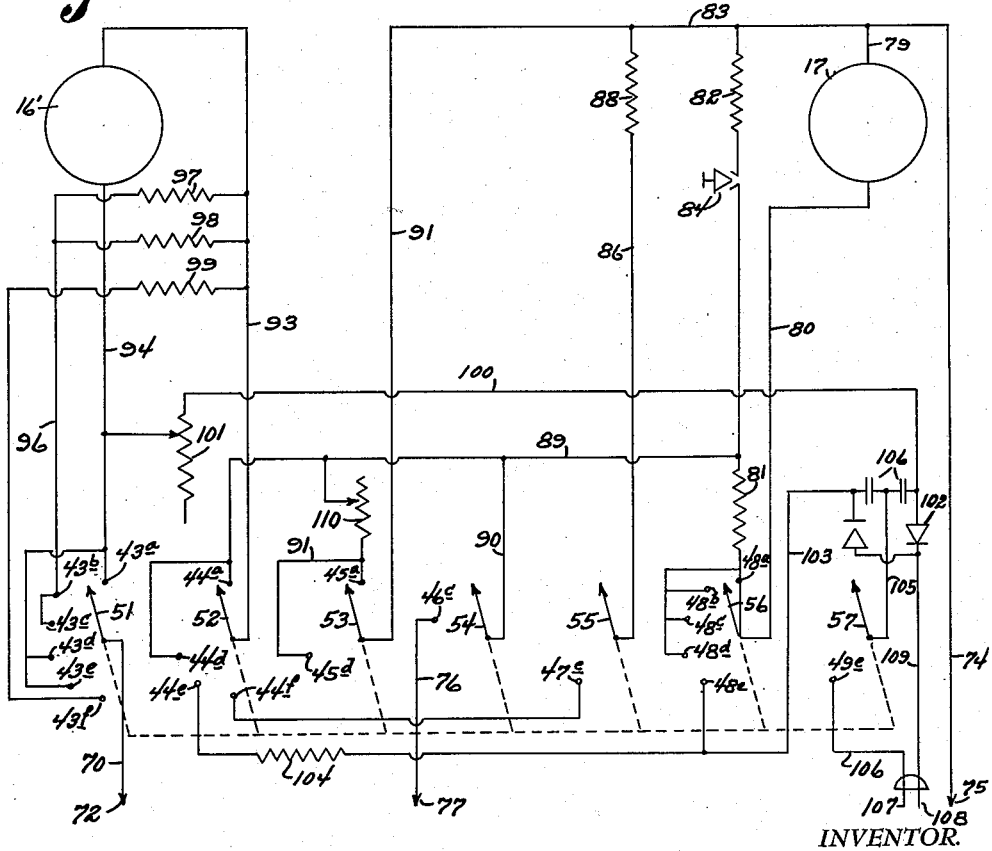
Figure 4 is a diagrammatic view of the testing circuit showing the electric meters, selector switches and resistance elements which are selectively coupled to the meters to provide different circuits for testing various pieces of electrical equipment.

In the circuit diagram shown in Figure 4 there is provided an electrical network for the meters (galvanometer type) 16 and 17, and the circuit network also includes the selector switch structure generally designated 41. A cable 70 is connected to the switch arm 51 and said cable is provided with a contact clip 72 which is adapted to be attached to an electrical appliance to be tested. Also, the circuit includes an electrical cable 74 having a similar clip 75 to be attached to the other terminal of certain pieces of electrical equipment. A third cable 76 is connected to the contact 46 of the switch structure 41 and is provided with a clip 77 for use in testing certain pieces of electrical equipment. The electrical cable 74 is connected to the electrical meter 17 by means of a connection 79, and the other side of the meter is connected to the switch arm 56 by a lead 80. The switch arm is also electrically connected to one of the contacts 48a which contact is connected to a resistance element 81 in series with another resistance element 82 connected to the meter 17 by a lead 83. An interrupter switch 84 is interposed between the resistance elements 81 and 82 to cut the resistance in and out of the circuit for testing certain equipment. The remaining contacts 48b, 48c, 48d and 48e are shown in Figure 4 with the contacts 48b, 48c and 48d electrically connected to one another and to the contact 48a.

The switch 55 is connected to the lead line 83 by means of a lead 86 having a resistance 88, and when the switch arm 55 engages the contact 47e a circuit is completed through the resistance. The switch 54 is adapted to engage the contact 46c which connects with the electrical cable 76, and said switch is connected to one side of the resistance 81 by means of a lead 89 and a branch lead 90.

The lead 83 is connected to the switch arm 53 by means of a lead line 91, and said switch is adapted to engage a contact 45a and a contact 45d which are electrically connected together as at 91. The lead 89 is connected with the contacts 44a and 44d, and the switch arm 52 cooperating therewith is electrically connected to the measuring instrument 16 by means of a lead 93. The other terminal of the measuring instrument 16 is electrically connected by means of a lead 94 to the contact 43a of the switch assembly 43, and in addition is electrically connected by means of a branch lead 45 to contacts 43d, 43e and 43f such that when the switch arm 51 is in engagement with the contacts 43a, 43d, 43e and 43f, the meter 16 will be in circuit. The contacts 43b and 43c are electrically connected together and to a lead 96 in series with resistance elements 97 and 98 which connect to the lead 93 to one side of the electrical measuring instrument 16. A resistance 99 is also connected to the lead 93 to the contact 43f of the switch 51. Also connecting the lead 94 is a lead 100 in which a resistance 101 is connected in series, and said resistance is of the variable type and is electrically connected by the lead 100 to a dry type rectifier network indicated at 102. The other side of the rectifier network 102 is connected by a lead 103 to the contact 48e of the switch structure 56 and in addition is connected to one of the contacts 44e of the switch structure 52. A fixed resistance 104 is interposed in the lead 103. The switch arm 57 is connected by a lead 105 to the rectifier network 102 between a pair of capacitance elements 106, in the lead 103. The contact 49e of the switch structure 57 is connected by a lead 106 to one terminal of an electrical plug 107, while the other terminal 108 is connected by a lead 109 to the dry rectifier network 102. The electric plug including the contacts 107—108 are adapted to be connected to a suitable source of electrical energy such as a house supply when testing certain pieces of electrical equipment.

A variable resistance element 110 is electrically connected between the leads 89 and 91 of the switch contacts 45a and 47d. The resistance elements 82, 88, 97, 98 and 99 are of a predetermined number of ohms, corresponding to the number of ohms of the moving coils of the galvanometers 16 and 17. Hence, when the coils are placed in series or parallel with the galvanometers 16 and 17, said galvanometers become ammeters and voltmeters depending upon whether the resistance elements are in series or parallel in the testing circuit.

It is well understood, that when the resistance is increased either in series or parallel with the galvanometer type measuring instruments 16 and 17 for indicating current and potential, a different scale must be provided for each instrument.

In testing such pieces of equipment as generators, batteries, starter motors, generator regulators, condensers and coils the terminals or clips 72, 75 and 77 are used as follows: Generator test, the control knob 26 is turned so that the switch contacts 51 to 57 are in the same position with the switch arm 51 engaging the contact 43a, the contact 52 engaging the contact 44a, the contact arm 53 engaging the contact 45a and the switch arm 56 engaging the contact 48a. With the terminals 72 and 75 connected to the terminals of the generator the testing circuit is obvious. For testing a battery the terminals 72 and 75 are connected to the battery and the knob 26 turned to the second position with the switch arm 51 engaging the contact 43b and the switch arm 56 engaging the contact 48b. It being noted that each time the knob 26 is turned different scales 30—31 appear beneath the windows 13. For testing starters, condensers and coils the contact clips 72, 75 and 77 are employed and in the case of testing a coil, the plug 107 is inserted in an outlet box to supply a source of current therefor. When testing generator regulators the clips 72 and 75 are connected to the terminals thereof and the switch knob 26 is turned such that the switch arm 51 engages the contact 43d while the switch arms 52 and 53 engage the contacts 44d and 45d. In this position of testing, the switch arms 55, 56 and 57 also engage contacts 48d and the switch 57 engages contact 49e.

It is readily obvious that the individual circuits will appear in the spaces 40, and that each time the knob 26 is turned to initiate a different testing circuit, corresponding scale readings or markings 30—31 will appear in the openings 13. Under most tests the galvanometer 16 becomes a voltmeter, while the measuring instrument 17 becomes an ammeter.

I claim:
1. In an electrical testing instrument having a plurality of electrical testing meters provided with indicating pointers, a testing circuit network for said meters including resistance elements and a selector switch for selectively connecting said resistance elements in series and parallel with said testing meters, the improvement comprising a dial having a plurality of scales thereon arranged to be positioned adjacent the indicating pointers of said meters and means connecting said dial and switch for simultaneous operation.

2. In an electrical testing instrument, having a plurality of testing meters provided with indicating pointers, a testing circuit network for said meters, a selective control switch in said circuit having a series of rotatable switch arms, the improvement comprising a dial connected to said switch to rotate with said arms and having a plurality of scales marked thereon to be interchanged with relation to the indicator pointers of said meters and a manual control knob for said switch.

3. In an electrical testing instrument having a casing provided with a pair of indicator openings, and an electrical measuring instrument located adjacent each opening with its indicator projecting beneath said opening, the improvement comprising a rotary selector switch mounted in said casing, a disk mounted to rotate with said switch having a series of scale markings on its peripheral marginal edge, said scale markings being arranged to project beneath said openings and arranged for being interchanged beneath said pointers, a testing circuit for said meters including resistance elements and manual control means for said switch for connecting said resistance elements in said circuit.

4. In an electrical testing instrument having a casing provided with a pair of indicator openings, and an electrical measuring instrument located adjacent each opening with its indicator projecting beneath said opening, the improvement comprising a selector switch mounted in said casing having a rotor shaft, a disk secured to said rotor shaft having a plurality of individual meter scales adjacent its peripheral edge and spaced circumferentially with respect to one another to aline with the indicator openings beneath said indicators, a testing circuit network for said meters and resistance elements in said network adapted to be selectively connected in series and parallel with said meters.

5. In an electrical testing instrument having a casing provided with a pair of indicator openings, and an electrical measuring instrument located adjacent each opening with its indicator projecting beneath said opening, the improvement comprising a selector switch mounted in said casing having a rotor shaft, a disk secured to said rotor shaft having a plurality of individual meter scales adjacent its peripheral edge and spaced circumferentially with respect to one another to aline with the indicator openings beneath said indicators, a testing circuit network for said meters and resistance elements in said network adapted to be selectively connected in series and parallel with said meters, said disk being provided with areas having marked testing circuit diagrams thereon adapted to register with another opening in said casing corresponding to the circuit arrangement controlled by said selector switch whereby the testing circuit connections made by the selector switch will be visible to the operator.

CHARLES ROSSO.

References Cited in the file of this patent

UNITED STATES PATENTS

| Number | Name | Date |
|---|---|---|
| 2,043,495 | Sanger | June 9, 1936 |
| 2,384,350 | Skulley | Sept. 4, 1945 |
| 2,466,558 | Sadlon | Apr. 5, 1949 |
| 2,558,276 | Simpson et al. | June 26, 1951 |

FOREIGN PATENTS

| Number | Country | Date |
|---|---|---|
| 23,958-98 | Great Britain | Dec. 23, 1898 |
| 325,496 | Germany | Sept. 18, 1920 |